(12) United States Patent
Furukawa et al.

(10) Patent No.: US 7,990,085 B2
(45) Date of Patent: Aug. 2, 2011

(54) GENERATOR CONTROL UNIT

(75) Inventors: Kimihisa Furukawa, Hitachi (JP);
Satoru Kaneko, Naka (JP); Tokihito Suwa, Hitachinaka (JP); Yuuichirou Takamune, Naka (JP); Satoru Ohno, Hitachinaka (JP); Kenta Katsuhama, Hitachinaka (JP); Katsuyo Tsushima, Ota (JP)

(73) Assignee: Hitachi, Ltd., Tokyo (JP)

( * ) Notice: Subject to any disclaimer, the term of this patent is extended or adjusted under 35 U.S.C. 154(b) by 704 days.

(21) Appl. No.: 12/133,088

(22) Filed: Jun. 4, 2008

(65) Prior Publication Data

US 2008/0303459 A1 Dec. 11, 2008

(30) Foreign Application Priority Data

Jun. 5, 2007 (JP) ................... 2007-149699

(51) Int. Cl.
*H02P 7/32* (2006.01)
*H02P 7/34* (2006.01)
(52) U.S. Cl. ........ 318/142; 318/151; 318/153; 318/811; 318/79; 318/84; 180/65.1; 180/65.21; 180/65.285
(58) Field of Classification Search .................. 318/142, 318/151, 153, 811, 79, 84; 180/65.1, 65.21, 180/65.285
See application file for complete search history.

(56) References Cited

U.S. PATENT DOCUMENTS

| | | | | |
|---|---|---|---|---|
| 5,113,125 | A | * | 5/1992 | Stacey ........................... 318/721 |
| 5,992,950 | A | * | 11/1999 | Kumar et al. .................. 303/151 |
| 7,193,395 | B2 | * | 3/2007 | O'Gorman et al. ............... 322/8 |

FOREIGN PATENT DOCUMENTS

| | | |
|---|---|---|
| JP | 60-106338 A | 6/1985 |
| JP | 05-176476 A | 7/1993 |
| JP | 2006-248469 A | 9/2006 |
| JP | 2006-288006 A | 10/2006 |
| JP | 2007-230298 A | 9/2007 |
| JP | 2007-237782 A | 9/2007 |
| JP | 2007-325388 A | 12/2007 |

\* cited by examiner

*Primary Examiner* — Lincoln Donovan
*Assistant Examiner* — Erick Glass
(74) *Attorney, Agent, or Firm* — Crowell & Moring LLP

(57) ABSTRACT

An object of the present invention is to provide a generator control unit having improved voltage response in a system which is not provided with a battery in a DC output unit.

In order to control the DC voltage of the DC voltage output terminal in a state where an electric load is connected to the DC voltage output terminal of a power generation unit, a PWM signal generation unit 429 generates a field voltage to be applied to a field winding terminal of the power generation unit. A feedback control unit 422 calculates a field voltage command value to be given to the PWM signal generation unit 429. Further, the feedback control unit 422 includes a PT control unit 423 which calculates a voltage deviation between a DC voltage detection value and a DC voltage command value to generate the field voltage command value through a PI operation based on the voltage deviation. The feedback control unit 422 includes compensation units 424 and 425 which generate a field voltage command value after compensating the output of the PT control unit 423 for the voltage deviation based on input/output transfer characteristics of the generator from the field voltage to the DC voltage.

8 Claims, 12 Drawing Sheets

GENERATOR CONTROL UNIT

BACKGROUND OF THE INVENTION

1. Field of the Invention

The present invention relates to a generator control unit which controls a generator.

2. Description of the Related Art

A power generation unit which combines a field winding-type three-phase synchronous generator and a diode rectifier, referred to as an alternator, has conventionally been used as an on-board generator. The alternator is a power generation unit which controls field voltage to control generator output to a desired value. Since the alternator makes it unnecessary to control a generator armature current by means of an inverter or a chopper, it provides a low-manufacturing-cost advantage and has been widely used as a generator for an automobile.

To control an output voltage of the alternator, it is common to perform feedback control on the field voltage through comparison of a detected DC output voltage with a DC voltage command value by use of a PT controller or the like (refer to, for example, JP-A-60-106338).

However, the method of controlling the field voltage uses a constant feedback gain of the PI controller and therefore is inferior to an armature control type in DC voltage control performance; its DC voltage response performance largely depends on rotational speed and load fluctuations.

As a method of performing PI control according to a deviation between a DC voltage value and a DC voltage command value, a technique of changing the feedback gain based on operating conditions of a power generation unit is known (refer to, for example, JP-A-60-106338). For example, effects of rotational speed fluctuations of the three-phase synchronous generator on the DC current is large in a low rotational speed region and small in a high rotational speed region. Therefore, the amount of feedback gain to be given is small in a low rotational speed region and large in a high rotational speed region. This makes is possible to restrain fluctuations of generated electric power caused by rotational speed fluctuations. Further, since an increase in the field current of the three-phase synchronous generator saturates the change of the DC current, the gain is increased according to an increase in the field current so that the power generation unit can supply electric power required by an electric load in a highly responsive manner.

SUMMARY OF THE INVENTION

However, with the technique disclosed in JP-A-5-176476, a battery is connected in parallel with a DC output unit, and control is generally performed on the DC voltage through DC voltage feedback so as to constantly maintain the DC voltage at the rated voltage value of the battery. That is, the constant-voltage control is performed on the DC voltage so as to restrain fluctuations of the DC voltage caused by fluctuations of an electric load connected in parallel with the battery and fluctuations of the DC voltage caused by the rotational speed fluctuations of the three-phase synchronous generator.

However, if a battery is not connected to the DC output, fluctuations of the DC voltage increases if a feedback gain is given as in JP-A-5-176476. Specifically, the technique disclosed in JP-A-5-176476 determines the feedback gain according to the responsiveness from the field current to the output current while voltage fluctuations are restrained by the battery. Therefore, if a battery is not connected to the alternator output, control based on the above-mentioned feedback gain induces voltage fluctuations. In this case, a large voltage feedback gain causes a voltage overshoot, and a small voltage feedback gain degrades voltage responsiveness. Further, such a phenomenon similarly occurs not only when no battery is provided but also when a small-capacity battery is provided or when a large-capacity battery is fully charged.

An object of the present invention is to provide a generator control unit that can improve voltage responsiveness.

(1) In order to attain the above generator control unit, the present invention representatively provides a generator control unit used for a power generation drive system, the system comprising: a power generation unit which includes a field winding-type three-phase synchronous generator and a diode rectifier which rectifies a three-phase AC voltage outputted from the three-phase synchronous generator to a DC voltage; and a three-phase synchronous motor directly driven by an output of the power generation unit; wherein the generator control unit comprises: a PWM signal generation unit which generates a field voltage to be applied to a field winding terminal of the power generation unit in order to control the DC voltage of the DC voltage output terminal in a state where an electric load is connected to the DC voltage output terminal of the power generation unit; and a feedback control unit which calculates a field voltage command value to be given to the PWM signal generation unit; wherein the feedback control unit includes a PI control unit which calculates a voltage deviation between a DC voltage detection value and a DC voltage command value to generate the field voltage command value through a PI operation based on the voltage deviation; and wherein the feedback control unit includes a compensation unit which generates the field voltage command value after compensating the output of the PI control unit for the voltage deviation based on input/output transfer characteristics of the generator from the field voltage to the DC voltage.

This configuration makes it possible to improve voltage responsiveness.

(2) In the above clause (1), the compensation unit is preferably a rotational speed fluctuation compensation unit which generates the field voltage command value after compensating the output of the PI control unit based on the rotational speed of the three-phase synchronous generator.

(3) In the above clause (2), the rotational speed fluctuation compensation unit preferably compensates for the output of the PI control unit by making the absolute value of the transfer characteristic of the PI control unit inversely proportional to the rotational speed of the three-phase synchronous motor.

(4) In the above clause (1), the compensation unit is preferably a gain compensation unit which compensates the output of the PI control unit with a gain based on the DC current of the power generation unit.

(5) In the above clause (1), the compensation unit is preferably a gain compensation unit which compensates the output of the PI control unit with a gain based on the field current of the power generation unit.

(6) In the above clause (1), the compensation unit is preferably a gain compensation unit which compensates the output of the PI control unit with a gain based on the DC voltage of the power generation unit.

(7) In the above clause (1), the compensation unit preferably generates the field voltage command value after compensating the output of the PI control unit by means of a compensation element which decreases with an increasing gain of the power generation unit from the field current to the DC voltage and increases with a decrease in the amplification factor.

(8) In the above clause (1), the compensation unit preferably uses a standard model which outputs, upon input of the DC voltage of the power generation unit thereto, a reference field voltage that is based on the assumption that there is no effect of magnetic saturation, i.e., a model used as a reference for an input/output relation from the DC voltage of the power generation unit to the field voltage of the power generation unit; the compensation unit includes a standard field voltage quantity compensation unit which obtains a standard field voltage compensation quantity for bringing the field voltage of the power generation unit close to the reference field voltage outputted by the standard model; and the compensation unit is a rotational speed fluctuation compensation unit which generates the field voltage command value after compensating the output of the PI control unit with the standard field voltage compensation quantity obtained by the standard field voltage quantity compensation unit.

(9) In order to accomplish the object, the present invention provides a control unit for controlling a generator, the generator comprising: a generator body which includes an armature having an armature winding and a magnetic field system having a field winding; and a controller which controls a field current supplied to the field winding to control the output of the armature winding; wherein a magnetic field command for controlling the field current is outputted to the controller so that a peak value of the field voltage of the field winding when a magnetic circuit of the generator body is in a saturation state is larger than that when the magnetic circuit of the generator body is in a non-saturation state.

This configuration makes it possible to improve voltage responsiveness.

(10) In order to accomplish the object, the present invention provides a vehicle drive unit comprising: a generator comprising generator body which includes an armature having an armature winding and a magnetic field system having a field winding, the generator body being driven by an engine for driving wheels, and a controller which controls a field current supplied to the field winding to control the output of the armature winding; a motor driven by electric power outputted from the generator to drive wheels different from the ones driven by the engine; and a control unit which controls the drive of the generator and the motor; wherein the control unit outputs a magnetic field command for controlling the field current to the controller so that a peak value of the field voltage of the field winding when a magnetic circuit of the generator body is in a saturation state is larger than that when the magnetic circuit of the generator body is in a non-saturation state.

This configuration makes it possible to improve voltage responsiveness.

In accordance with the present invention, voltage responsiveness can be improved.

DETAILED DESCRIPTION OF THE PREFERRED EMBODIMENTS

The configuration and operation of a generator control unit according to an embodiment of the present invention will be explained below with reference to FIGS. 1 to 10.

First of all, the configuration and operation of a four-wheel drive electric vehicle which mounts the generator control unit thereon according to the present embodiment will be explained below with reference to FIG. 1.

Figure 1:
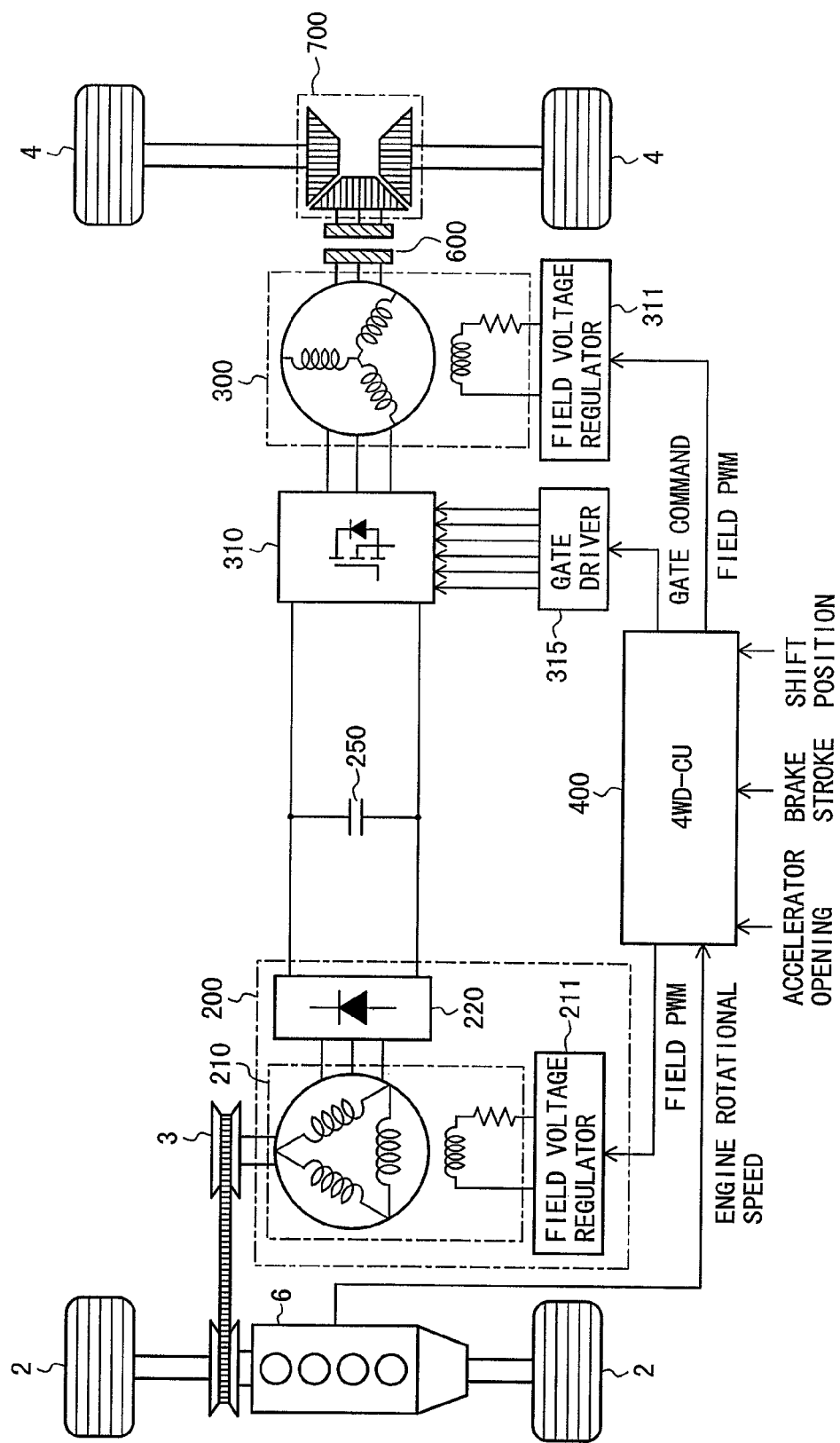
FIG. 1 is a system block diagram showing the configuration of a four-wheel drive electric vehicle which mounts thereon a generator control unit according to an embodiment of the present invention.

FIG. 1 is a system block diagram showing the configuration of the four-wheel drive electric vehicle which mounts the generator control unit thereon according to an embodiment of the present invention.

The four-wheel drive electric vehicle shown in FIG. 1 is not provided with a battery that accumulates the output voltage of the alternator between the alternator, which is a power generation unit, and a synchronous motor driven by the output voltage of the alternator. Specifically, the synchronous motor is directly driven by the output voltage of the alternator. With the present embodiment, a case where the present invention is applied to a system not having a battery will be explained as an example; however, it may be possible to apply the present invention not only to a system having a small-capacity battery but also to a system having a large-capacity battery when it is fully charged.

The four-wheel drive electric vehicle drives front wheels 2 with an engine 6 and rear wheels 4 with a three-phase synchronous motor 300. An alternator 200 is connected to the engine 6 through a belt pulley 3, and the three-phase synchronous motor 300 is driven by electric power generated by the alternator 200. That is, the front wheels 2 and the engine 6 are not connected with the rear wheels 4 mechanically but connected through electric wiring. The torque of the front wheels 2 is determined by the torque of the engine 6 and the alternator 200, and the torque generated at the rear wheels 4 depends on the torque generated by the three-phase synchronous motor 300. The four-wheel drive electric vehicle excels in starting performance on a skiddy road surface. For example, if a front wheel skids on a climbing road surface, the torque of the engine 6 is reduced so as not to increase the skid, and at the same time, the three-phase synchronous motor 300 connected to the rear wheels is driven with electric power generated by the alternator 200, thus avoiding the skid.

The system of the present embodiment is based on a method of directly driving the three-phase synchronous motor 300 with electric power generated by the alternator, wherein a large-capacity battery is not mounted or a small-capacity battery is mounted, thereby reducing the space for mounting an electric system. Further, in comparison with a mechanical four-wheel drive vehicle which mechanically transmits the power of the engine to the rear wheels, this method provides rear-wheel torque which is equivalent to that of the mechanical four-wheel drive vehicle and is superior thereto in rear-wheel adhesion performance by high-response electric control.

The alternator 200 comprises a three-phase synchronous generator 210, a field voltage regulator 211, and a rectification circuit 220. The three-phase AC electric power outputted by the three-phase synchronous generator 210 is converted to DC electric power by the rectification circuit 220. The field voltage regulator 211 controls the field voltage to be supplied to a field coil of the three-phase synchronous generator 210, thereby allowing conversion of the output power of the three-phase synchronous generator 210. A field voltage command value is given from a four-wheel drive control unit (4WD-CU) 400 as a field PWM signal.

The output power of the alternator 200 is supplied to the three-phase synchronous motor 300 through a capacitor 250 and an inverter 310. The inverter 310 converts the DC output power of the alternator 200 to three-phase AC electric power. The three-phase AC electric power is supplied to three-phase (U-, V-, and W-phase) armature coils of the three-phase synchronous motor 300. A gate signal from a gate driver 315 is supplied to a gate terminal of a switching device constituting the inverter 310. The gate driver 315 performs ON/OFF control on the switching device constituting the inverter 310 in response to a gate command from the 4WD-CU 400. The capacitor 250 is provided in order to smooth ripples caused by the switching operation of the inverter 310.

A field voltage regulator 311 controls the field voltage to be supplied to the field coil of the three-phase synchronous motor 300, thereby allowing conversion of the output torque of the three-phase synchronous motor 300. A field voltage command value is given from the four-wheel drive control unit (4WD-CU) 400 as a field PWM signal.

A differential gear 700 is installed between the three-phase synchronous motor 300 and the rear wheels 4. The differential gear 700 equally distributes the torque of the three-phase synchronous motor 300 to the right and left rear wheels 4. The alternator 200 and the three-phase synchronous motor 300 are controlled by the 4WD-CU 400. The 4WD-CU 400 inputs an engine rotational speed signal indicating the rotational speed of the engine 6, an accelerator opening signal indicating the depression amount of an accelerator, a brake stroke signal indicating the depression amount of a brake pedal, a shift position signal indicating the shift position of a transmission.

The configuration and operation of the 4WD-CU 400 including the generator control unit according to the present embodiment will be explained below with reference to FIG. 2.

Figure 2:
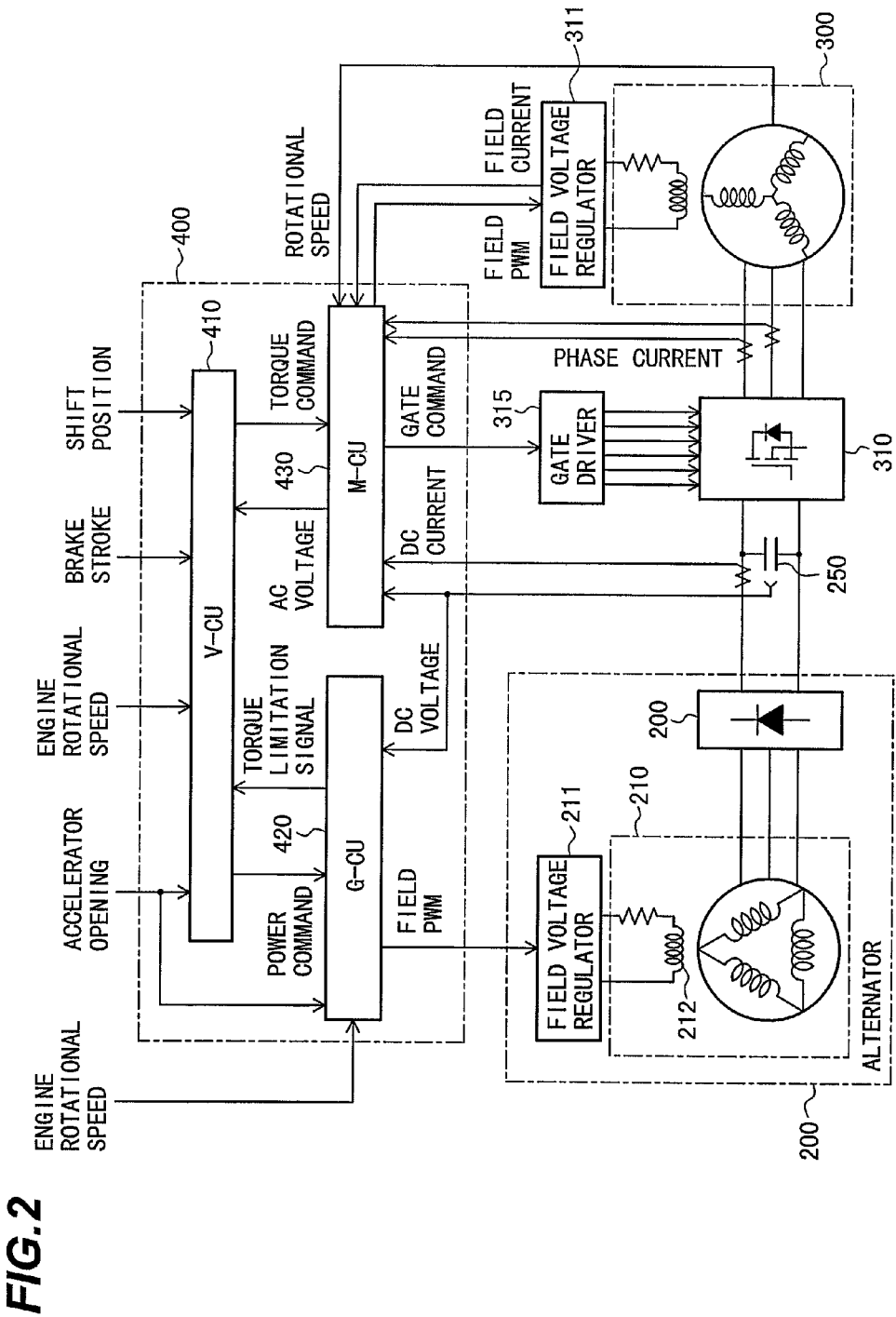
FIG. 2 is a system block diagram showing the configuration of a 4WD-CU which includes the generator control unit according to an embodiment of the present invention.

FIG. 2 is a system block diagram showing the configuration of the 4WD-CU including the generator control unit according to an embodiment of the present invention. The same reference numerals as in FIG. 1 denote identical parts.

The 4WD-CU 400 comprises a vehicle control unit 410, a generator control unit 420, and a motor control unit 430.

The vehicle control unit (V-CU) 410 inputs the engine rotational speed signal from the engine 6; the accelerator opening signal, the brake stroke signal, and the shift position signal from the driver; the torque limitation signal from the generator control unit 420; and the AC voltage of the three-phase synchronous motor 300 from the motor control unit 430. The vehicle control unit 410 also outputs an electric power command signal to the generator control unit 420 and a torque command to the motor control unit 430.

The V-CU 410 calculates each input signal based on a program and outputs calculation results to the generator control unit (G-CU) 420 and the motor control unit (M-CU) 430 as output signals.

The G-CU 420 inputs the engine rotational speed signal from the engine 6, an electric power command signal and a DC voltage signal from the V-CU 410; and outputs a field voltage duty PWM signal to the field voltage regulator 211 of the alternator 200 and a torque limitation signal to the V-CU 410. The G-CU 420 calculates each input signal based on a program and outputs calculation results to the V-CU 410 and the field voltage regulator 211 as output signals.

The M-CU 430 inputs a torque command signal from the V-CU 410, a motor rotational speed signal from the three-phase synchronous motor 300, a phase current signal, a DC current signal, a DC voltage signal, and a field current signal; and outputs an AC voltage to the V-CU 410 and a gate signal command value to the gate driver 315. The M-CU 430 calculates each input signal based on a program and outputs calculation results to the gate driver 315, the field voltage regulator 311, and the V-CU 410 as output signals.

The alternator 200 is a power generation unit comprising the field-winding-type three-phase synchronous generator 210, the rectification circuit 220, and the field voltage regulator 211.

The configuration of the alternator 200 controlled by the generator control unit according to the present embodiment will be explained below with reference to FIG. 3.

Figure 3:
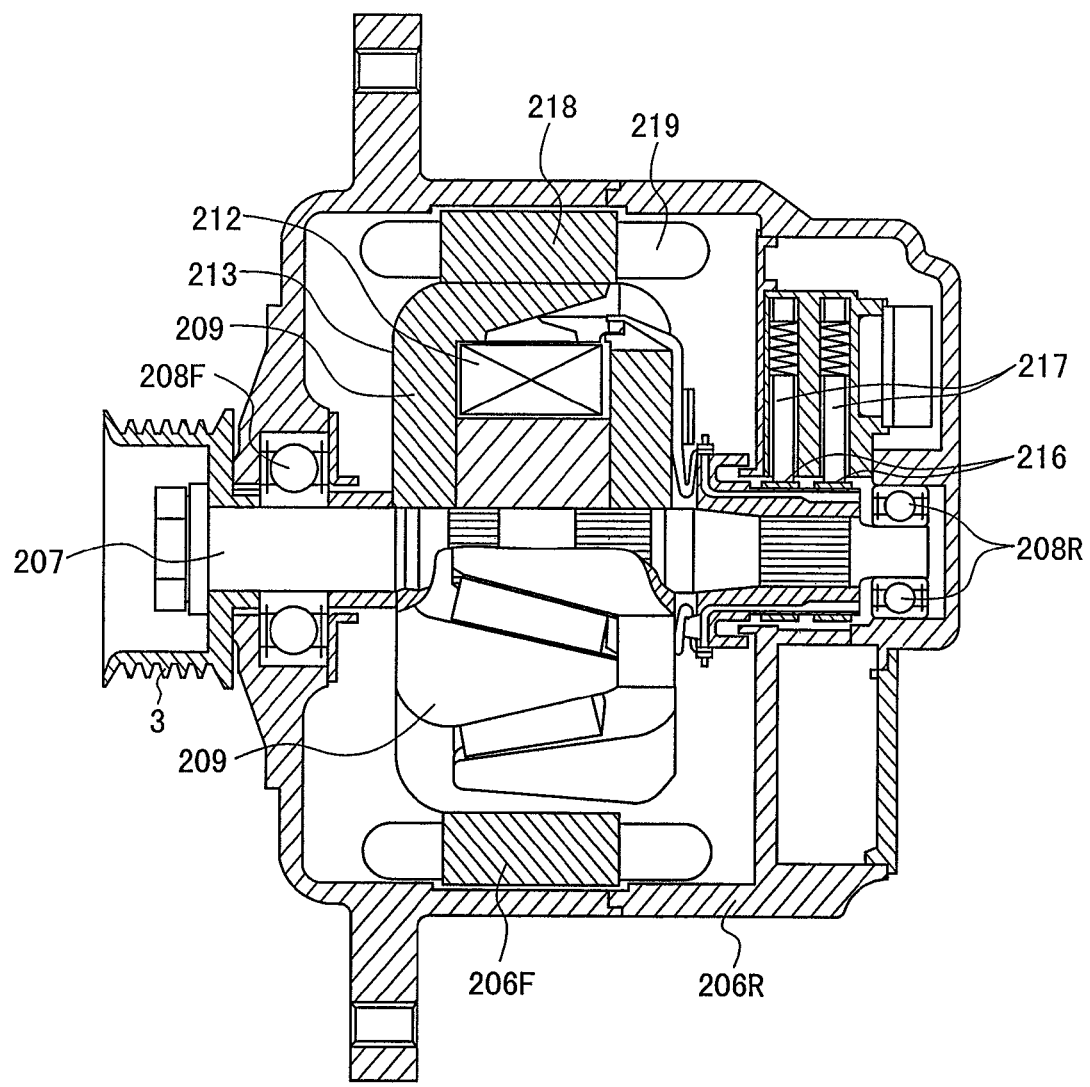
FIG. 3 is a sectional view showing the configuration of an alternator controlled by the generator control unit according to an embodiment of the present invention.

FIG. 3 is a sectional view showing the configuration of the alternator controlled by the generator control unit according to an embodiment of the present invention. The same reference numerals as in FIG. 1 denote identical parts. The three-phase synchronous generator 210 comprises a rotor 213 (field) and a stator 218 (armature). The rotor 213 comprises a claw magnetic pole 209 having alternately and oppositely arranged claw portions and a field winding 212 provided on the inner circumferential side of the claw magnetic pole 209. The field winding 212 is wound in the shaft direction. The claw magnetic pole 209 transmits a field flux produced by the field winding 212 to the rotor surface. The claw magnetic pole 209 is fixed to a shaft 207.

Bearings 208F and 208R are attached to a front housing 206F and a rear housing 206R, respectively. The rotor 213 is supported by the bearings 208F and 208R so as to rotate with respect to the front housing 206F and the rear housing 206R.

A slip ring 216 is provided on the shaft 207 and connected with the field winding 212. A brush 217 and the slip ring 216 are in contact with each other. An externally supplied field voltage is supplied to the field winding 212 through the brush 217 and the slip ring 216.

The stator 218 is attached on the inner circumferential side of the front housing 206F. The stator 218 includes a stator coil 219.

Since the field-winding-type three-phase synchronous generator 210 is provided with the rotor 213 having the field winding 212, this power generation unit can respond to a wide range of rotational speeds from low to high speeds. Specifically, when the rotor 213 is rotating at a low speed, the field current is increased to increase the field flux, thus ensuring a required power voltage. In contrast, when the rotor 213 is rotating at a high speed, the field current is decreased to decrease the field flux, thus preventing an excessive rise of an induced voltage.

The circuit configuration of the alternator 200 controlled by the generator control unit according to the present embodiment will be explained below with reference to FIG. 4.

Figure 4:
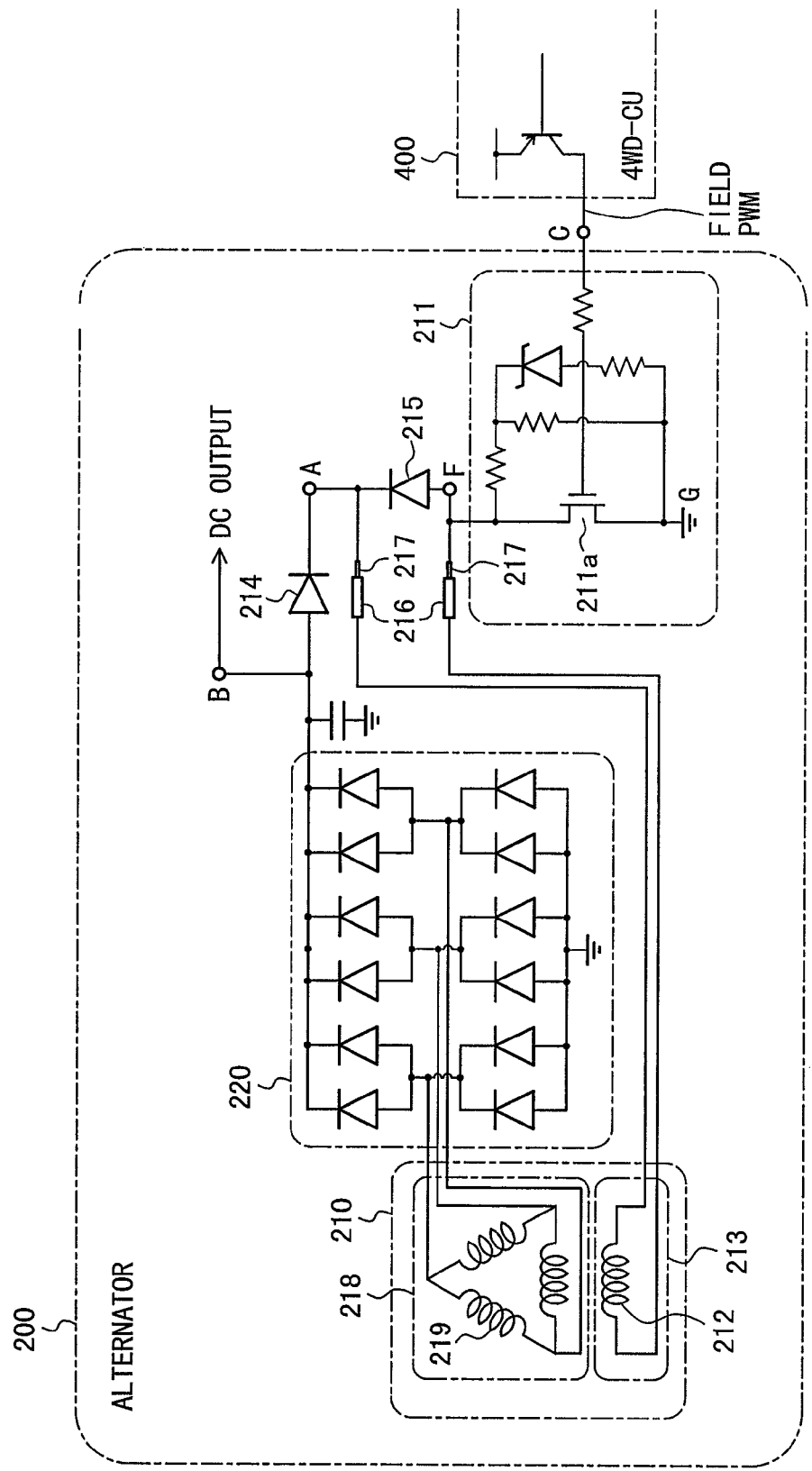
FIG. 4 is a circuit diagram showing the circuit configuration of the alternator controlled by the generator control unit according to an embodiment of the present invention.

FIG. 4 is a circuit diagram showing the circuit configuration of the alternator controlled by the generator control unit according to an embodiment of the present invention. The same reference numerals as in FIGS. 1 and 3 denote identical parts.

The field winding 212 of the rotor 213 is connected to terminals A and F through the slip rings 216 and the brushes 217. On the other hand, a voltage applied to the terminal F is controlled by the field voltage regulator 211.

The field voltage regulator 211 controls the field current flowing in the field winding 212 based on a field duty PWM signal generated by the generator control unit 420 and controls the DC voltage outputted from a terminal B. The field duty PWM signal, a rectangular wave signal composed of 2-level voltage, is applied to the terminal C of the field voltage regulator 211. A transistor 211a repeats ON and OFF states according to the rectangular wave voltage applied to the terminal C. When the transistor 211a is ON, the voltage of the terminal F becomes approximately 0V; therefore, the voltage applied to the field winding 212 connected to the terminals A and F approximately equals the voltage of the terminal A. On the other hand, when the transistor 211a is OFF, the terminals A and F are in an electrically conductive state by a diode 215 as long as the field current is flowing in the field winding 212, and the voltage applied to the field winding 212 becomes approximately 0V. The average value of a field voltage Vf applied to the field winding 212 is represented by the following Equation (1) using an ON time (Ton) and an OFF time (Toff) of the transistor 211a.

[Equation 1]

$$\text{Average of field voltage } Vf = Vdc \cdot Ton/(Ton + Toff) \quad (1)$$

where, Vdc is a DC voltage.

When the field voltage Vf is applied to the field winding 212, the field current flows to generate a field flux. The field flux generated by the field winding 212 of the rotor 213 is interlinked with an armature winding 219 of the stator 218 as a rotating field to induce a voltage in the armature winding 219. Since a line voltage caused by the induced voltage is an AC voltage, it is rectified by the rectifier 220, and therefore a DC voltage appears at the terminal B.

As shown in FIG. 1, the DC voltage output terminal of the alternator 200 is connected to the inverter 310 with smoothing capacitors 250 connected in parallel. The inverter 310 outputs a three-phase AC voltage and supplies it to the field winding-type three-phase synchronous motor 300. The mechanical output of the three-phase synchronous motor 300 is transmitted to the rear wheels 4 through a clutch 600 and the differential gear 700.

The smoothing capacitor 250 is a circuit provided in order to smooth harmonics generated in the alternator 200 and in the inverter 310. It is composed of an electrolytic capacitor or a film capacitor. Since an object of the smoothing capacitor 250 is to absorb harmonics, the capacity thereof is not so large as to accumulate regenerative energy from the three-phase synchronous motor 300. It is as small as, for example, several hundreds microfarads.

When the inverter 310 inputs DC electric power generated by the alternator 200, it outputs a three-phase AC voltage that drives the three-phase synchronous motor 300. The inverter 310 inputs signals from the gate driver 315 controlled based on the three-phase alternating-voltage command values outputted by the M-CU 430 and outputs a three-phase AC voltage. The DC electric power flowing through the smoothing capacitor 250 is converted to the three-phase AC voltage by the inverter 310, which drives the three-phase synchronous motor 300. The inverter 310 is commonly composed of a self arc-extinguishing semiconductor device, such as an IGBT, and a diode connected in antiparallel therewith.

A signal outputted from the gate driver 315 operates the gate or base of the self arc-extinguishing semiconductor device of the inverter 310 to strike an electric arc. The potential of the M-CU 430 and that of the inverter 310 are generally insulated in terms of DC by a transformer or a photo-coupler in the gate driver 315.

The configuration and control details of the G-CU 420, which is a generator control unit according to the present embodiment, will be explained below with reference to FIGS. 5 to 10.

First of all, the overall configuration of the G-CU 420, a generator control unit according to the present embodiment, will be explained below with reference to FIG. 5.

Figure 5:
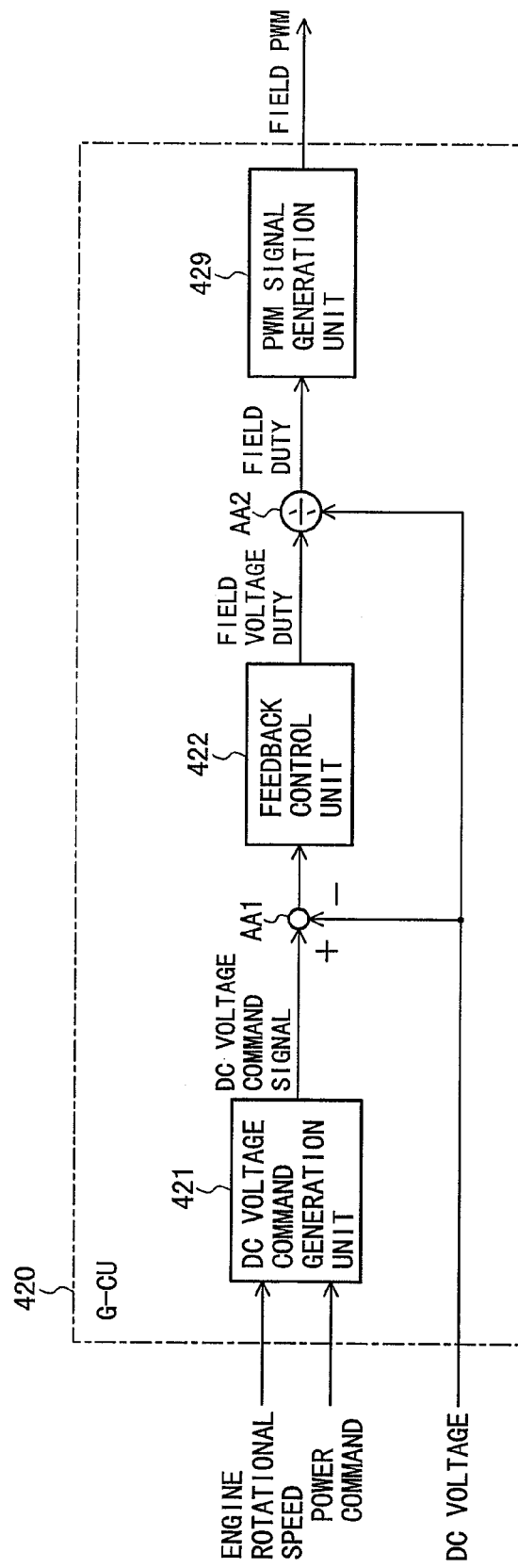
FIG. 5 is a block diagram showing the configuration of a G-CU which is a generator control unit according to an embodiment of the present invention.

FIG. 5 is a block diagram showing the configuration of the G-CU, a generator control unit according to an embodiment of the present invention. The same reference numerals as in FIGS. 1 and 2 denote identical parts.

The generator control unit (G-CU) 420 inputs the engine rotational speed signal, the electric power command signal, and the DC voltage signal and outputs the field voltage duty PWM signal.

The G-CU 420 comprises a DC voltage command value generation unit 421, a feedback control unit 422, a subtractor AA1, a divider AA2, and a PWM signal generation unit 429. The DC voltage command value generation unit 421 and the feedback control unit 422 in the G-CU 420 calculate input signals based on the following control details and output calculation results.

The DC voltage command value generation unit 421 generates a DC voltage command signal by use of the engine rotational speed signal and the electric power command signal. The subtractor AA1 calculates a deviation between the DC voltage command signal and the DC voltage and outputs it to the feedback control unit 422.

The feedback control unit 422 performs control operations on the deviation and outputs a field voltage command. The divider AA2 divides the field voltage command by the DC voltage to generate a field duty signal. The field duty signal is converted to the field voltage duty PWM signal and outputted by the PWM signal generation unit 429.

The field voltage command is inputted to the alternator to form a DC voltage feedback system. In this case, the DC voltage feedback system includes generator characteristics ranging from the field voltage to the DC voltage of the alternator. Here, the generator characteristics of the alternator largely depend on magnetic saturation and other factors.

The overall configuration of the DC voltage feedback system controlled by the generator control unit according to the present embodiment will be explained below with reference to FIG. 6.

Figure 6:
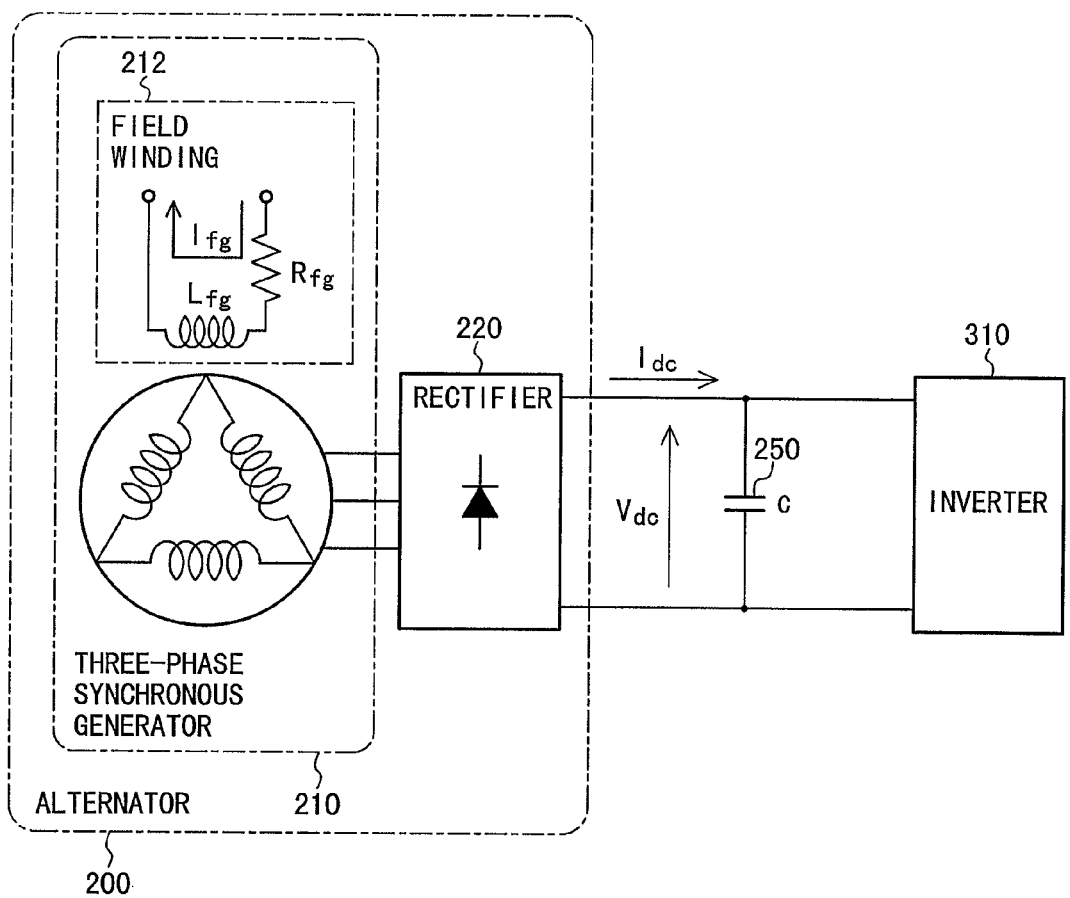
FIG. 6 is a block diagram showing the configuration of the G-CU, a generator control unit according to an embodiment of the present invention.

FIG. 6 is a block diagram showing the configuration of the G-CU, a generator control unit according to an embodiment of the present invention. The same reference numerals as in FIGS. 1 and 2 denote identical parts.

The three-phase synchronous generator 210 of the alternator 200 includes the field winding 212. Here, the field winding 212 has a resistive component Rfg and a reactive component Lfg. Further, a field current Ifg is flowing in the field winding 212.

The output of the three-phase synchronous generator 210 is rectified by the rectifier 220 and then inputted to the inverter 310. Here, the inverter 310 inputs an input current Idc and an input voltage Vdc.

Voltage and current characteristics of the alternator and load characteristics of the inverter in the DC voltage feedback system controlled by the generator control unit according to the present embodiment will be explained below with reference to FIG. 7.

Figure 7:
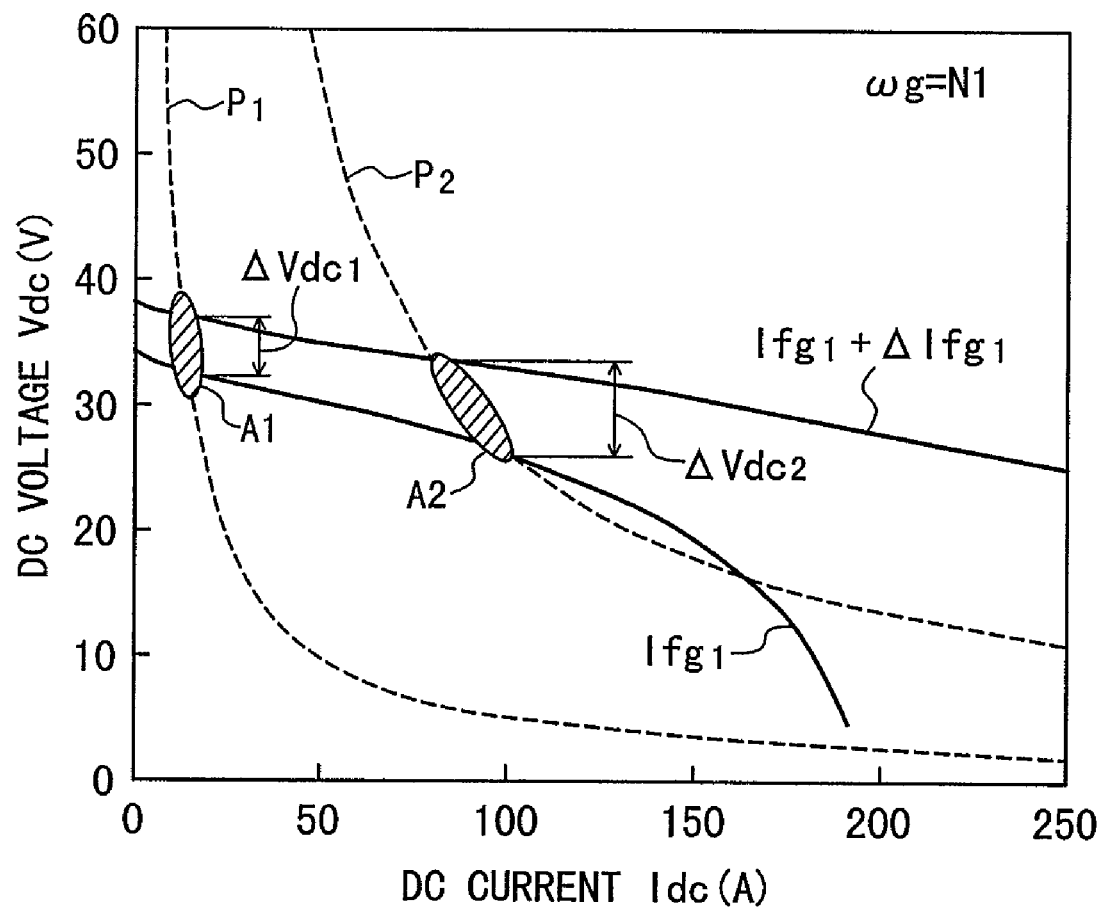
FIG. 7 is a diagram explaining voltage and current characteristics of the alternator and load characteristics of the inverter in a DC voltage feedback system controlled by the generator control unit according to an embodiment of the present invention.

FIG. 7 is a diagram explaining voltage and current characteristics of the alternator and load characteristics of the inverter in the DC voltage feedback system controlled by the generator control unit according to an embodiment of the present invention.

FIG. 7 shows the voltage and current characteristics of the alternator when the rotational speed of the alternator 200, ωg, is N1, superimposed with two load characteristics of the inverter when the inverter operates on constant electric power.

A solid line Ifg1 denotes an isomagnetic field characteristic showing possible values of the DC current Idc and the DC voltage Vdc when the field current is Ifg1. A solid line Ifg1+ΔIfg1 denotes an isomagnetic field characteristic when the field current is slightly increased by ΔIfg1 with respect to the isomagnetic field characteristic Ifg1.

Dashed lines P1 and P2 show load characteristics when the inverter operates on constant electric power P1 and P2, respectively.

If the field current Ifg is changed from Ifg1 to Ifg1+ΔIfg1, the DC voltage increases only by ΔVdc1 in the case of constant electric power characteristic P1 and by ΔVdc2 in the case of constant electric power characteristic P2. Specifically, the DC voltage change ΔVdc2 in the case of A2 is larger than the DC voltage change ΔVdc1 in the case of A1. Therefore, when the conventional control method is applied in the case of the load characteristic P1, an overshoot of output response does not easily occurs; however, when the conventional control method is applied in the case of the load characteristic P2, an overshoot of voltage may occur. Similarly, the feedback gain cannot be determined based only on the magnitude of the current of generated power.

The voltage and current characteristics of the alternator when a constant field current is maintained in the DC voltage feedback system controlled by the generator control unit according to the present embodiment will be explained below with reference to FIG. 8.

Figure 8A:
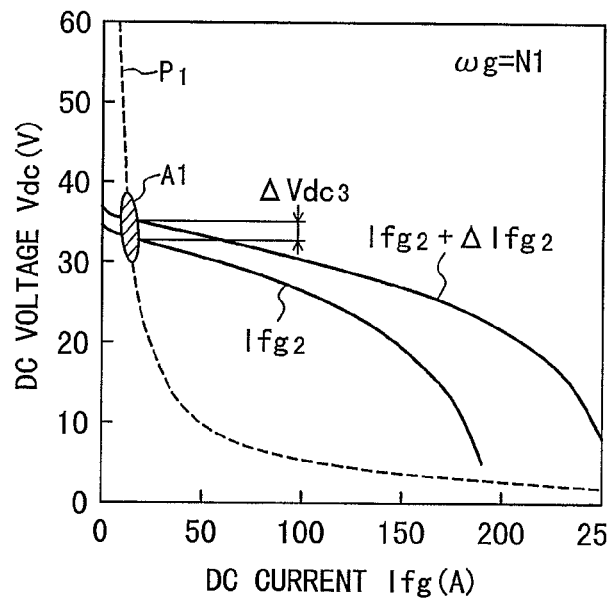
FIGS. 8A and 8B are diagrams explaining voltage and current characteristics of the alternator when a constant field current is sent in the DC voltage feedback system controlled by the generator control unit according to an embodiment of the present invention.
Figure 8B:
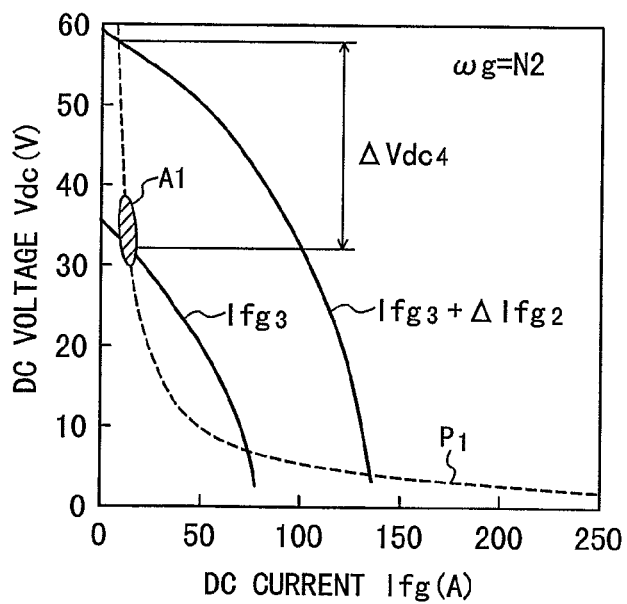

FIGS. 8A and 8B are diagrams explaining the voltage and current characteristics of the alternator when a constant field current is maintained in the DC voltage feedback system controlled by the generator control unit according to the present embodiment.

FIG. 8A shows a case where the rotational speed of the alternator, ωg, is N1; FIG. 8B, a case where the rotational speed of the alternator, ωg, is N2. Here, N2 is larger than N1 (N2>N1).

Further, referring to FIG. 8A, the solid line Ifg2 shows an isomagnetic field characteristic when the field current is Ifg2. The solid line Ifg2+ΔIfg2 denotes an isomagnetic field characteristic when the field current is slightly increased by ΔIfg2 with respect to the isomagnetic field characteristic Ifg2. And, referring to FIG. 8B, the solid line Ifg3 shows an isomagnetic field characteristic when the field current is Ifg3. The solid line Ifg3+ΔIfg3 denotes an isomagnetic field characteristic when the field current is slightly increased by ΔIfg3 with respect to the isomagnetic field characteristic Ifg3.

The dashed line P1 denotes a load characteristic when the inverter operates on the constant electric power P1.

The inclination of isomagnetic field characteristics at a high rotational speed of the alternator (ωg=N2) as shown in FIG. 8B is steeper than that at a low rotational speed of the alternator (ωg=N1) as shown in FIG. 8A. That is, an output voltage change with respect to a field current change at a high rotational speed of the alternator is larger than that at a low rotational speed of the alternator.

The difference between the characteristics represented in FIGS. 8A and 8B has a large effect on the DC voltage response. When the same DC voltage step response at a low rotational speed is compared with that at a high rotational speed with a constant power consumption of the inverter 310 and the motor 300, the DC voltage feedback gain increases with increasing rotational speed in the case of a conventional control system. Therefore, at a low rotational speed, the DC voltage response is slow; at a high rotational speed, the response is fast, but an overshoot may occur. Specifically, for example, if the feedback gain is set to as large a value as possible within a range in which the DC voltage step response does not cause an overshoot when the rotational speed of the alternator, ωg, is N1, the DC voltage step response when the rotational speed of the alternator, ωg, is N2 may cause an overshoot. Further, if the feedback gain is set to as large a value as possible within a range in which the DC voltage step response does not cause an overshoot when the rotational speed of the alternator, ωg, is N2, the DC voltage step response when the rotational speed of the alternator, ωg, is N1 becomes slow. That is, the gain of the DC voltage from the deviation to the output is small in a region where the rotational speed is low, as represented by the rotational speed of the alternator, ωg=N1 rpm; in contrast, it is large in a region where the rotational speed is high, as represented by the rotational speed of the alternator, ωg=N2 rpm. Thus, the above-mentioned difference in response results.

In order to solve the above conventional technical problem, the present embodiment optimizes the field voltage, which is an operation variable of the alternator 200.

The present embodiment is applied to such a power generation unit characterized by a field voltage operation variable associated with the magnitude of a low-frequency gain of generator transfer characteristics from the field current to the output state. The preferability of the above-mentioned characteristic for a field-voltage-control-type generator will be explained below with reference to the alternator of FIG. 6, the field-voltage-control-type DC-output generator.

The alternator 200 comprises the field winding 212, the three-phase synchronous generator 210, and the rectifier 220 with a diode bridge. The capacitor 250 is attached to the DC voltage output terminal of the alternator 200, and electric power is supplied to the inverter 310. In order to determine whether or not the transient response of the voltage Vdc is favorable as an output state, minute fluctuations of electrical characteristics will now be considered. Suppose that initial electrical characteristics (Vfg, Ifg, Vdc, and Idc) have changed to Vfg+ΔVfg, Ifg+ΔIfg, Vdc+ΔVdc, and Idc+ΔIdc, respectively, in Δt seconds.

In this case, transfer characteristics from the field voltage to the field current are represented by the following Equation (2).

[Equation 2]

$$\Delta I_{fg}/\Delta V_{fg} = 1/(L_{fg}s + R_{fg}) \qquad (2)$$

Further, transfer characteristics ranging from the field current to the output voltage are represented as a first-order lag system by the following Equation (3).

[Equation 3]

$$\frac{\Delta V_{dc}}{\Delta I_{fg}} = \frac{k}{a} \frac{1}{Cs + \frac{1}{a} - \frac{I_{dc}}{Y_{dc}}} \qquad (3)$$

where C denotes a capacitance of the capacitor 250; k and a are variables that change with the states of the generator and the load.

Here, when an internal magnetic flux $\Psi$ of the alternator is defined by the following Equation (4), a and k are represented by the following Equations (5) and (6), respectively.

[Equation 4]

$$V_{dc} = \omega_g \Psi(I_{dc}, I_{fg}) - RI_{dc} \qquad (4)$$

In Equation (4), cog denotes a rotational speed of the alternator 200.

[Equation 5]

$$a = -\left(\theta_g \frac{\partial \Psi}{\partial I_{dc}} - R\right) \qquad (5)$$

[Equation 6]

$$k = \omega_g \frac{\partial \Psi}{\partial I_{fg}} \qquad (6)$$

Here, R denotes an internal resistance of the armature of the alternator; $\Psi$, an internal magnetic flux of the alternator.

In Equation (5), $\omega_g \cdot (\partial \Psi / \partial I_{dc})$ is larger enough than R, and therefore Equation (5) can be approximated to the following Equation (7).

[Equation 7]

$$a \approx -\omega_g \frac{\partial \Psi}{\partial I_{dc}} \qquad (7)$$

Further, since R·Idc in Equation (3) is small, Equation (3) can be approximated to the following Equation (8).

[Equation 8]

$$V_{dc} = \omega_g \Psi(I_{dc}, I_{fg}) - RI_{dc} \qquad (8)$$
$$\approx \omega_g \Psi(I_{dc}, I_{fg})$$

Meanwhile, supposing that the capacitance C of the capacitor is smaller enough than (1/a)−(Idc/Vdc) in Equation (3), it is possible, by plugging Equations (7) and (8) into Equation (3), to obtain an approximate value of a gain |G(0)| of ΔVdc/ΔIfg as shown by the following Equation (9).

[Equation 9]

$$|G(0)| = \left|\frac{\Delta V_{dc}}{\Delta I_{fg}}\right| \qquad (9)$$
$$\approx \left|\omega_g \frac{\partial \Psi}{\partial I_{fg}} \frac{1}{1 + \frac{I_{dc}}{\Psi} \frac{\partial \Psi}{\partial I_{dc}}}\right|$$

Therefore, the following Equation (10) can be obtained by Equations (2) and (9).

[Equation 10]

$$|\Delta V_{dc}/\Delta V_{fg}| \approx |G(0)|/(L_{fg}s + R_{gf}) \qquad (10)$$

Figure 10A:
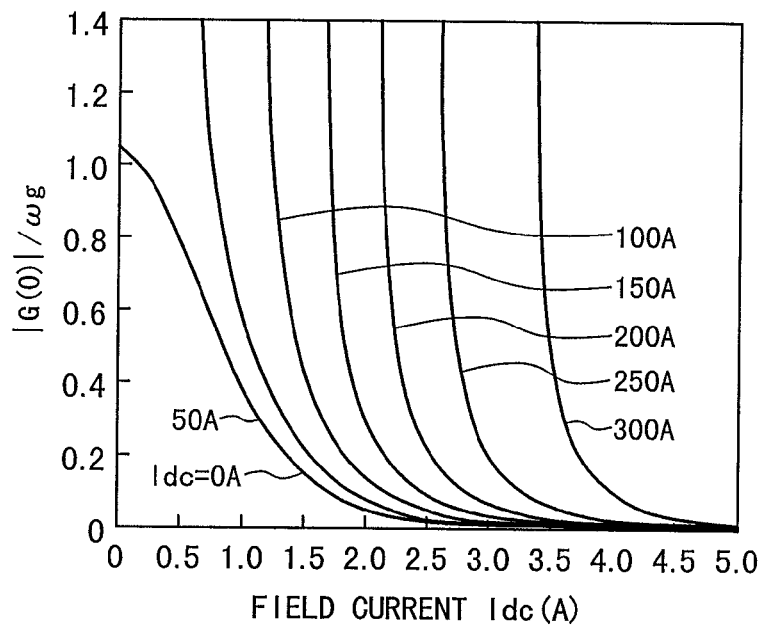
FIG. 10A is a diagram explaining a gain of the alternator controlled by the generator control unit according to an embodiment of the present invention.

Note that |G(0)|/ωg is the characteristics shown in FIG. 10A. Here, the gain of ΔVdc/ΔIfg, G|(0)|, denotes the gain of the alternator from the field current to the DC voltage.

The denominator of the gain |G(0)| is 1−a □(Idc/Vdc), and the numerator thereof is k as shown in Equation (9). a is −ΔVdc/ΔIfg when Ifg is fixed, and the inclination of isomagnetic field characteristic is represented by −a. k is ΔVdc/ΔIfg when Idc is fixed. k is small when isomagnetic field characteristics are densely spaced, and large when they are sparsely spaced. Here, both a and k are positive values.

Here, characteristics of the gain |G(0)| will be explained with reference to FIGS. 7 and 8 as examples.

FIG. 7 is a diagram explaining characteristics of |G(0)| at two different power characteristics P1 and P2 consumed by the inverter 310 and the three-phase synchronous motor 300. The isomagnetic field characteristics of FIG. 7 show characteristics when a field current of the alternator is fixed, i.e., two different characteristics having a field current of Ifg1 and Ifg1+ΔIfg1, respectively.

Here, comparison will be made between two different operating ranges A1 and A2.

First of all, the absolute value of the inclination of A2 with respect to the two isomagnetic field characteristics, Ifg1 and Ifg1+ΔIfg1, is slightly larger than that of A1. Accordingly, a is larger in A2 than in A1.

Further, when Idc is fixed, the space between the two isomagnetic field characteristics, Ifg1 and Ifg1+ΔIfg1, is smaller in the vicinity of A2 than in the vicinity of A1. Therefore, k is larger in A2 than in A1.

Further, an absolute value of the inclination of constant electric power characteristics, |Vdc/Idc|, is larger in the vicinity of A1 than in the vicinity of A2.

Here, when the isomagnetic field characteristics and the constant electric power characteristics are compared in terms of the absolute values of the inclinations, the inclination of the isomagnetic field characteristics is larger than that of the constant electric power characteristics both in the vicinity of A1 and A2. Therefore, 0<a<Vdc/Idc, i.e., 0<a □(Idc/Vdc)<1.

From the magnitude relation between a and Idc/Vdc in the vicinity of A1 and A2, 1−a □(Idc/Vdc) is larger in A1 than in A2.

Meanwhile, in accordance with the definition of |G(0)| shown in Equation (9), |G(0)| is proportional to ΔVdc and inversely proportional to ΔIfg.

When the two isomagnetic field characteristics, Ifg1 and Ifg1+ΔIfg1, in the vicinity of A1 and A2 are compared, the magnitude of |G(0)| is proportional to ΔVdc1 and Δdc2, respectively. Therefore, this also indicates that |G(0)| is larger in A2 than in A1.

Comparisons of the above-mentioned parameters are shown in Table 1.

TABLE 1

| Operating region | k: a | Vdc/ numerator | 1 − a × (Idc/Vdc): denominator | |G(0)| | DVdc |
|---|---|---|---|---|---|
| A1 | Small Small | Large | Large | Small | DVdc1: Small |
| A2 | Large Large | Small | Small | Large | DVdc2: Large |

FIGS. 8A and 8B are diagrams explaining the characteristics of |G(0)| when the characteristics P1 of the electric power consumed by the inverter 310 and the three-phase synchronous motor 300 are fixed and the rotational speed of the alternator, ωg, is N1 and N2, respectively.

Comparisons of characteristics in the range A1 will be made below. DC voltage and DC current regions shown by the range A1 are equal both in the graphs for ωg=N1 and ωg=N2.

The absolute value of the inclination of isomagnetic field characteristics at two different rotational speeds is larger when ωg=N2 than when ωg=N1. Accordingly, a is larger when ωg=N2 than when ωg=N1.

Further, when Idc is fixed, the space between two isomagnetic field characteristics, Ifg2 and Ifg2+ΔIfgs2, is larger when ωg=N2 than when ωg=N1. Accordingly, k is larger when ωg=N2 than when ωg=N1.

Further, the absolute value of the inclination of constant electric power characteristics, Vdc/Idc, is larger when ωg=N1 than when ωg=N2. Here, since 0<a□(Idc/Vdc)<1, 1−a□(Idc/Vdc) is larger when ωg=N1 than when ωg=N2.

Meanwhile, the magnitude relation of |G(0)| is proportional to ΔVdc3 and ΔVdc4, respectively, from Equation (9). Therefore, this also indicates that |G(0)| is larger when ωg=N2 than when ωg=N1.

Comparisons of the above-mentioned parameters are shown in Table 2.

TABLE 2

| Rotational speed ω g | k: a Numerator | Vdc/Idc | 1 − a × (Idc/Vdc): Denominator | |G(0)| | DVdc |
|---|---|---|---|---|---|
| N1: Small | small Small | Equivalent | Large | Small | DVdc3: Small |
| N2: Large | Large Large | Equivalent | Small | Large | DVdc4: Large |

FIGS. 7 and 8 indicates that a ratio of the DC voltage change ΔVdc to the field current change ΔIfg largely depends on operating conditions of the alternator and the inverter and that the ratio is associated with the value of |G(0)|.

Based on the above explanation, a control system will be configured for the transfer function of the first-order lag system from the field voltage to the DC voltage shown in the above-mentioned Equation (10), and then effects of the magnitude of |G(0)| on the response time in DC voltage control will be considered below.

The configuration of the feedback control unit 422 used for the generator control unit according to the present embodiment will be explained below with reference to FIG. 9.

Figure 9:
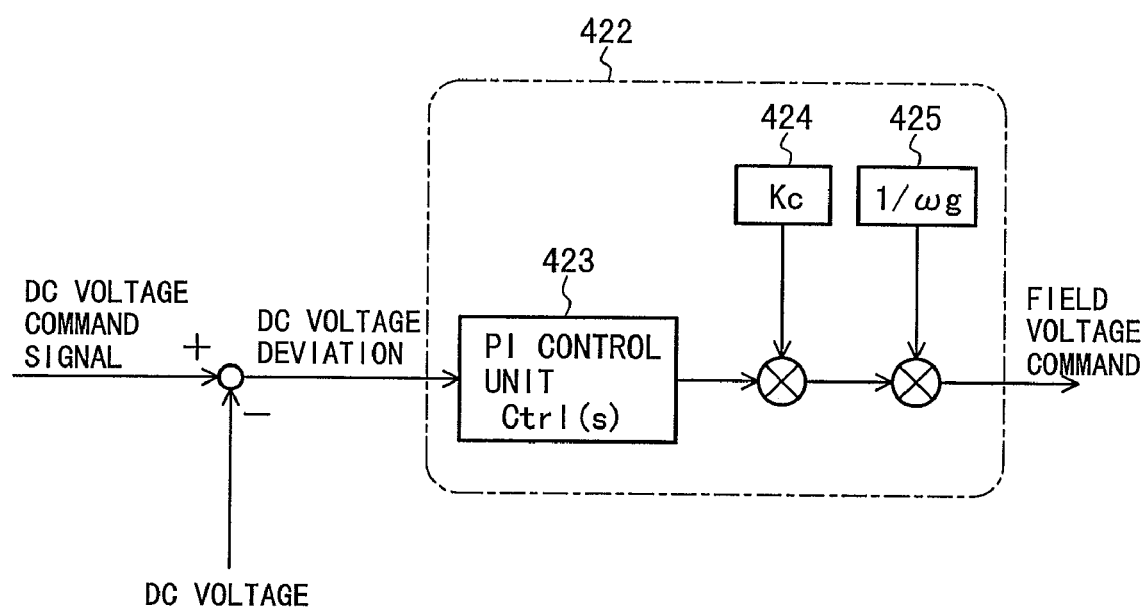
FIG. 9 is a block diagram showing the configuration of a feedback control unit used for the generator control unit according to an embodiment of the present invention.

FIG. 9 is a block diagram showing the configuration of the feedback control unit used for the generator control unit according to an embodiment of the present invention.

The feedback control unit 422 comprises a PI control unit 423, a gain compensation unit 424, and a rotational speed fluctuation compensation unit 425.

Here, supposing that the proportional gain of the PI control unit 423 is Kpi□Lfg and the integral gain Kpi□Rfg, the transfer characteristic Ctrl(s) of the PI control unit 423 is represented by the following Equation (11).
[Equation 11]

$$Ctrl(s) = Kpi\ Lfg + (Kpi\ Rfg/s) \qquad (11)$$

where Kpi is a constant.

In the example of FIG. 9, at later stages of Ctrl(s), Ctrl(s) is multiplied by a compensation gain Kc at the gain compensation unit 424 for adjusting the DC voltage response and then multiplied by a rotational speed fluctuation compensation quantity (1/ωg), an inverse of the rotational speed of the alternator, at the rotational speed fluctuation compensation unit 425.

Here, since the field voltage command virtually equals the field voltage actually applied to the field winding 212, and forward transfer characteristics from the DC voltage deviation to the DC voltage are represented by Equation (12).
[Equation 12]

$$Ctrl(s) \times (Kc/\omega g) \times |G(0)|/(Lfgs + Rfg) = |G(0)|/s \qquad (12)$$

Therefore, a transfer characteristic from the DC voltage command signal to the DC voltage is represented by Equation (13).
[Equation 13]

$$1/(\tau s + 1) \qquad (13)$$

where τ is a time constant that determines DC voltage responsiveness and is given by Equation (14).
[Equation 14]

$$\tau = 1/(Kpi \times Kc \times |G(0)|/\omega g) \qquad (14)$$

Equation 14 indicates that the smaller τ, the shorter becomes the response time from the DC voltage command signal to the DC voltage; the larger τ, the longer becomes the response time. From Equation (14), since the response time τ of the DC voltage is determined by Kpi, Kc, |G(0)|, and ωg, the response time can be adjusted by changing these parameters according to |G(0)|.

A gain of the alternator controlled by the generator control unit according to the present embodiment and a compensation gain when feedback control is performed will be explained below with reference to FIG. 10.

Figure 10B:
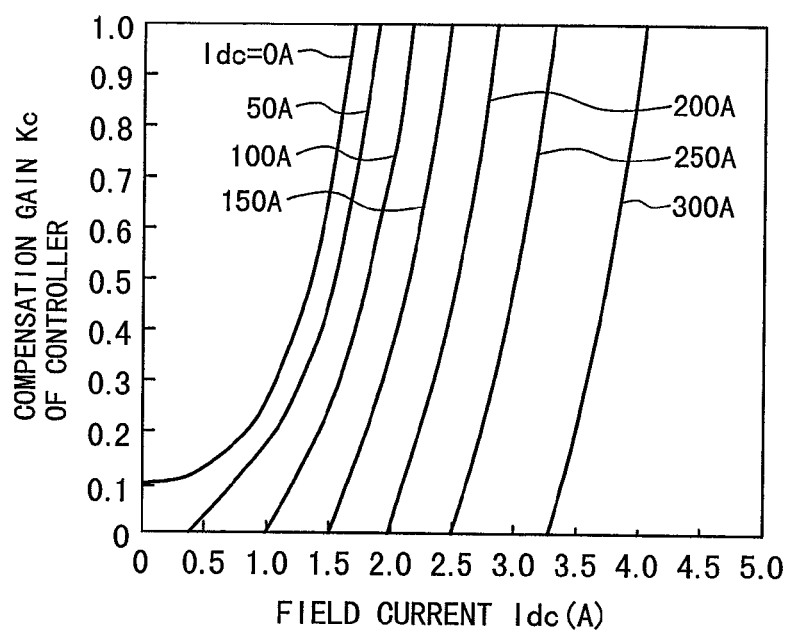
FIG. 10B, a diagram explaining a compensation gain when feedback control is performed.

FIG. 10A is a diagram explaining a gain of the alternator controlled by the generator control unit according to an embodiment of the present invention; FIG. 10B, a diagram explaining a compensation gain when feedback control is performed.

As mentioned earlier, |G(0)|/ωg of the alternator has the ωcharacteristics shown in FIG. 10A. Therefore, in order to restrain a variation of τ of Equation (14), the compensation gain Kc of the gain compensation unit 424 is set to a value that is proportional to an inverse number of |G(0)|/ωg of FIG. 10A, i.e., ωg/|G(0)|.

Thus, the compensation gain Kc is represented by the characteristics shown in FIG. 10B. That is, the compensation gain Kc decreases with increasing gain |G(0)|/cog and increases with decreasing gain |G(0)|/cog.

Since |G(0)|/ωg is a parameter determined by Ifg and Idc as shown in FIG. 10A, the compensation gain Kc of the controller shown in FIG. 10B is also a parameter having arguments Ifg and Idc. Therefore, the gain compensation unit 424 compensates the gain through the DC current Idc of the power generation unit and compensates the gain through the field current Ifg of the power generation unit.

Further, since Idc is uniquely determined if ωg, Vdc, and Ifg are determined, the characteristics of |G(0)|/ωg can be regarded as a function having arguments Ifg, Vdc, and ωg. That is, it is also possible to regard the compensation gain Kc of the controller as a function having arguments Ifg, Vdc, and ωg. Therefore, the gain compensation unit 424 compensates the gain through the DC voltage Vdc of the power generation unit.

Here, the difference between a conventional case and the present embodiment will be explained below.

The method disclosed in JP-A-60-106338 is the most common PI control method. It is provided only with the PI control unit 423 of FIG. 9, and not provided with the gain compensation unit 424 and the rotational speed fluctuation compensation unit 425 thereof.

Specifically, even if the gain |G(0)| changes, multiplication by the compensation gain Kc and the rotational speed fluctuation compensation quantity (1/ωg) for compensating the change is not performed, resulting in a large variation of the rotational speed fluctuation compensation τ.

The method disclosed in JP-A-5-176476 is similar to the present embodiment in that Kc is changed, but differs therefrom in how Kc is changed in relation to the change of the gain |G(0)|. JP-A-5-176476 discloses the control method used in a state where the DC voltage is kept approximately constant by the battery. Under this condition, the object of restraining a variation of the response time of the DC current is accomplished by increasing Kc in relation to an increase in |G(0)|. However, under a situation assumed by the present embodiment where there is no battery and only a smoothing capacitor having a very small capacitance is connected in the DC unit, the method of JP-A-5-176476 conversely increases a variation of the response time τ of the DC voltage.

A technique proposed by the present embodiment is to appropriately change Kc according to the magnitude of the gain |G(0)| in order to reduce a variation of the response time τ of the DC voltage.

Comparisons of the present embodiment with conventional cases of JP-A-60-106338 and JP-A-5-176476 are summarized in Table 3.

TABLE 3

| | |G(0)| increase | |G(0)| decrease | τ with large |G(0)| | τ with small |G(0)| | τ variation |
|---|---|---|---|---|---|
| JP-A-60-106338 | Kc not adjusted | Kc not adjusted | Small | Large | Large |
| JP-A-5-176476 | Kc increase | Kc decrease | Very small | Very large | Very large |
| Embodiment 1 | Kc decrease | Kc increase | Medium | Medium | Small |

As explained above, in accordance with the present embodiment, the generator is controlled based on the nonlinearity of the field characteristics of the alternator, thus reducing a variation of the DC voltage response in a wide operating region. That is, the alternator characteristics can make the DC voltage response robust also against change of an induction voltage caused by magnetic circuit saturation and rotational speed fluctuations. For example, in accordance with the present embodiment, if a magnetic circuit of the generator body which includes an armature (stator) having an armature winding and a field (rotor) having a field winding is in a saturation state, the generator control unit outputs a magnetic field command for controlling the field current to the controller (field voltage regulator) for controlling the field current to be supplied to the field winding so that a peak value of the field voltage of the field winding when the magnetic circuit of the generator body is in a saturation state is larger than that when it is in a non-saturation state. In accordance with the present embodiment, it is thus possible to improve the responsiveness of the alternator, thereby supplying electric power required for motor drive with a favorable response regardless of the operating points of the alternator, and improving the drive performance of the wheels by the vehicle drive unit.

The configuration and operation of a generator control unit according to another embodiment of the present invention will be explained below with reference to FIGS. 11 and 12. The configuration of the four-wheel drive electric vehicle which mounts thereon the generator control unit according to the present embodiment is the same as that shown in FIG. 1. Further, the configuration of the 4WD-CU 400 including the generator control unit according to the present embodiment is the same as that shown in FIG. 2. Further, the configuration of the alternator 200 controlled by the generator control unit according to the present embodiment is the same as that shown in FIG. 3. Further, the circuit configuration of the alternator 200 controlled by the generator control unit according to the present embodiment is the same as that shown in FIG. 4. Still further, the overall configuration of the G-CU 420 which is a generator control unit according to the present embodiment is the same as that shown in FIG. 5.

Here, the configuration of the feedback control unit 422 used for the generator control unit according to the present embodiment will be explained below with reference to FIGS. 11 and 12.

Figure 11:
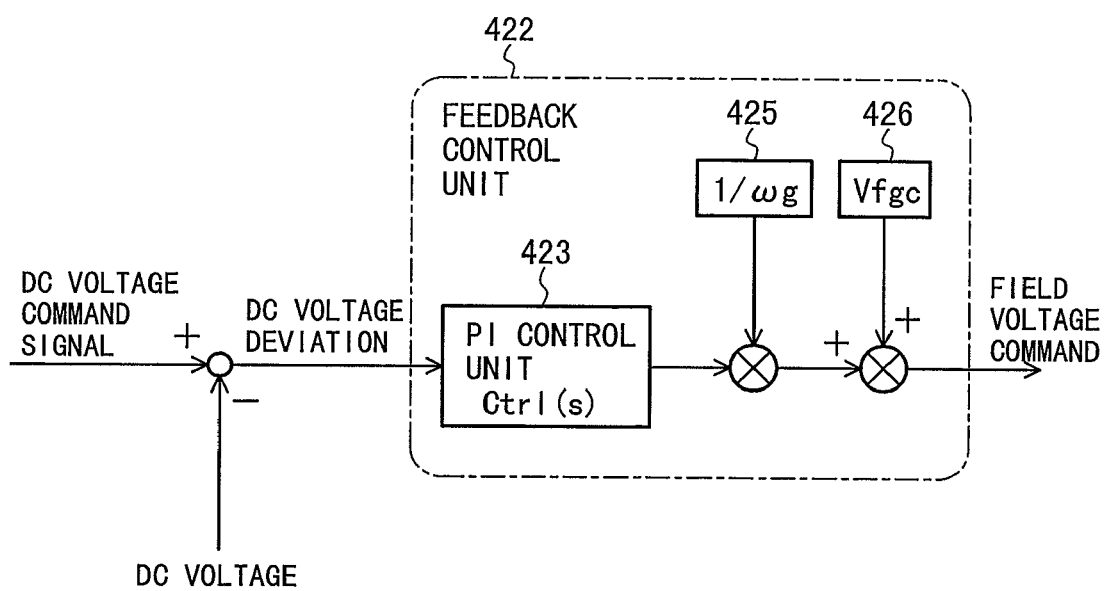
FIG. 11 is a block diagram showing the configuration of the feedback control unit used for a generator control unit according to another embodiment of the present invention.
Figure 12:
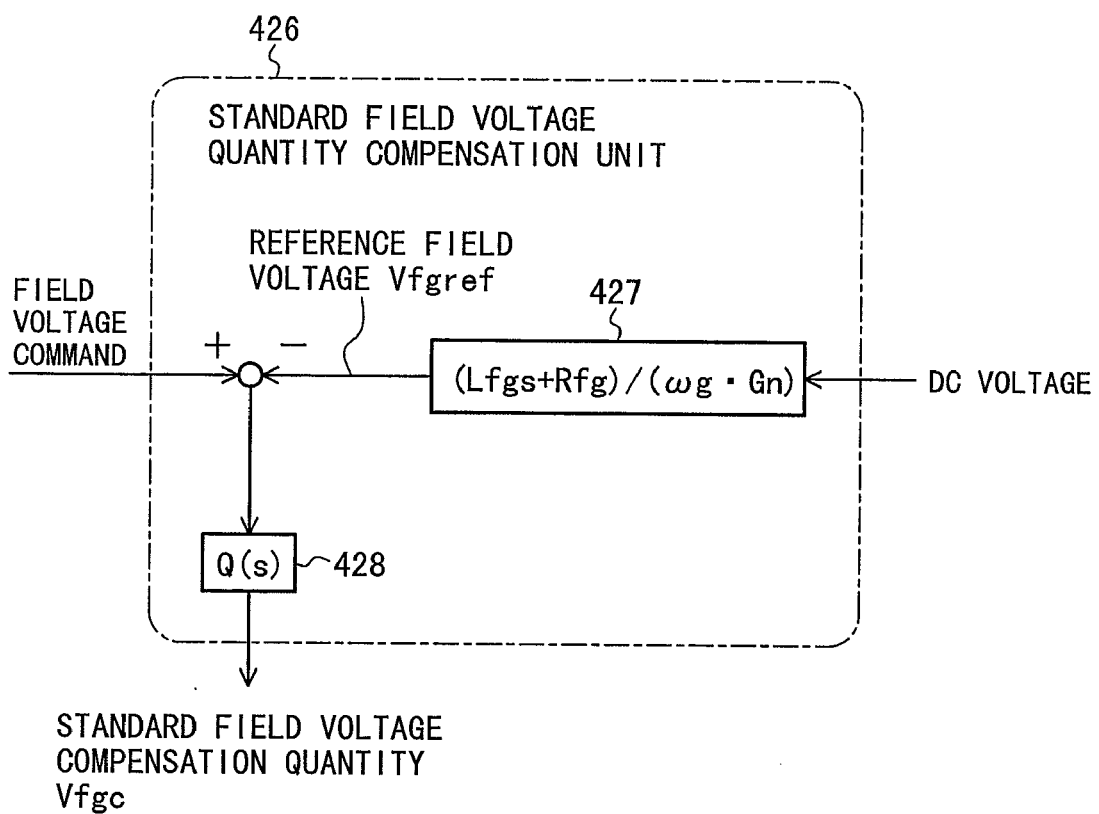
FIG. 12 is a block diagram showing the configuration of the feedback control unit used for a generator control unit according to another embodiment of the present invention.

FIGS. 11 and 12 are block diagrams showing the configuration of the feedback control unit used for the generator control unit according to another embodiment of the present invention.

In accordance with the present embodiment shown in FIG. 11, the transfer characteristic Ctrl(s) of the PI control unit having a proportional gain of Kpi□Lfg and an integral gain of Kpi□Rfg, and the section of the rotational speed fluctuation compensation quantity (1/ωg) are the same as those of FIG. 9; however, multiplication by the compensation gain Kc is not performed. Instead, a standard field voltage quantity compensation unit 426 is newly added, and a standard field voltage compensation quantity Vfgc is added as an element for compensating the field voltage command value.

FIG. 12 shows a specific method of producing the Vfgc in the standard field voltage quantity compensation unit 426. The standard field voltage quantity compensation unit 426 comprises a standard model 427 and a low-pass filter 428.

The standard model 427 shown in FIG. 12 is a model used as a reference for the input/output relation from the DC voltage to the field voltage. A parameter (ωg·Gn) is equivalent to |G(0)| shown in Equation (9). Here, with actual characteristics of the alternator, |G(0)| changes by both magnetic saturation and rotational speed fluctuations. In contrast, ωg·Gn, where Gn is a constant, changes only by rotational speed fluctuations, which is a kind of ideal model from which the characteristics by magnetic saturation are eliminated. When a detected DC-voltage signal is inputted to the standard model 427, a reference field voltage Vfgref based on the assumption that there is no effect of magnetic saturation is outputted from the standard model 427. The standard field voltage compensation quantity Vfgc for bringing the field voltage Vfg close to the reference field voltage can be obtained based on a deviation between the field voltage Vfg and the reference field voltage Vfgref.

However, a lot of high-frequency components are contained in the deviation between the field voltage Vfg and the reference field voltage Vfgref, and therefore the deviation is sent to the low-pass filter Q(s) to obtain the field voltage compensation quantity Vfgc.

Therefore, nonlinear characteristics of the alternator are compensated by the magnetic saturation compensation quantity Vfg and the rotational speed fluctuation compensation quantity; as a result, the response time of the DC voltage does not easily fluctuate even if an operating condition of the alternator changes.

In accordance with the present embodiment, when $|G(0)|/\omega g$ increases, the change of the field voltage command value is restrained by Vfgc. When $|G(0)|/\omega g$ decreases, in contrast, Vfgc compensates for the decrease so that the change of the field voltage command value increases. As a result, the variation of $\tau$ decreases, and accordingly the variation of the DC voltage response decreases in a wide operating region.

The standard field voltage compensation quantity Vfgc may be tabulated based on operating conditions of the alternator.

As explained above, also in accordance with the present embodiment, the generator is controlled based on the nonlinearity of the field characteristics of the alternator, thus reducing a variation of the DC voltage response in a wide operating region. That is, the alternator characteristics can make the DC voltage response robust also against change of an induction voltage caused by magnetic circuit saturation and rotational speed fluctuations.

What is claimed is:

1. A generator control unit used for a power generation drive system, the system comprising:
   a power generation unit which includes a field-winding-type three-phase synchronous generator and a diode rectifier which rectifies a three-phase AC voltage outputted from the three-phase synchronous generator to a DC voltage; and
   a three-phase synchronous motor directly driven by an output of the power generation unit;
   wherein the generator control unit comprises:
   a PWM signal generation unit which generates a field voltage to be applied to a field winding terminal of the power generation unit in order to control the DC voltage of the DC voltage output terminal in a state where an electric load is connected to the DC voltage output terminal of the power generation unit; and
   a feedback control unit which calculates a field voltage command value to be given to the PWM signal generation unit;
   wherein the feedback control unit includes a PI control unit which calculates a voltage deviation between a DC voltage detection value and a DC voltage command value to generate the field voltage command value through a PI operation based on the voltage deviation; and
   wherein the feedback control unit includes a compensation unit which generates the field voltage command value after compensating the output of the PI control unit for the voltage deviation based on input/output transfer characteristics of the generator from the field voltage to the DC voltage.

2. The generator control unit according to claim 1, wherein:
the compensation unit is a rotational speed fluctuation compensation unit which generates the field voltage command value after compensating the output of the PI control unit based on the rotational speed of the three-phase synchronous generator.

3. The generator control unit according to claim 2, wherein:
the rotational speed fluctuation compensation unit compensates for the output of the PI control unit by making the absolute value of the transfer characteristic of the PI control unit inversely proportional to the rotational speed of the three-phase synchronous motor.

4. The generator control unit according to claim 1, wherein:
the compensation unit is a gain compensation unit which compensates the output of the PI control unit with a gain based on the DC current of the power generation unit.

5. The generator control unit according to claim 1, wherein:
the compensation unit is a gain compensation unit which compensates the output of the PI control unit with a gain based on the field current of the power generation unit.

6. The generator control unit according to claim 1, wherein:
the compensation unit is a gain compensation unit which compensates the output of the PI control unit with a gain based on the DC voltage of the power generation unit.

7. generator control unit according to claim 1, wherein:
the compensation unit generates the field voltage command value after compensating the output of the PI control unit by means of a compensation element which decreases with an increasing gain of the power generation unit from the field current to the DC voltage and increases with a decrease in the amplification factor.

8. generator control unit according to claim 1, wherein:
the compensation unit uses a standard model which outputs, upon input of the DC voltage of the power generation unit thereto, a reference field voltage that is based on the assumption that there is no effect of magnetic saturation, i.e., a model used as a reference for an input/output relation from the DC voltage of the power generation unit to the field voltage of the power generation unit;
the compensation unit includes a standard field voltage quantity compensation unit which obtains a standard field voltage compensation quantity for bringing the field voltage of the power generation unit close to the reference field voltage outputted by the standard model; and
the compensation unit is a rotational speed fluctuation compensation unit which generates the field voltage command value after compensating the output of the PI control unit with the standard field voltage compensation quantity obtained by the standard field voltage quantity compensation unit.

* * * * *